(12) United States Patent  
Chiba et al.

(10) Patent No.: US 8,447,262 B2
(45) Date of Patent: May 21, 2013

(54) EMERGENCY CALL CODE INFORMATION ACQUIRING SYSTEM

(75) Inventors: Toshiharu Chiba, Kawasaki (JP); Mitsunari Ueno, Kawasaki (JP); Kazutaka Sato, Kawasaki (JP); Kenichi Tsuboya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 12/690,239

(22) Filed: Jan. 20, 2010

(65) Prior Publication Data

US 2010/0120395 A1 May 13, 2010

Related U.S. Application Data

(63) Continuation of application No. PCT/JP2007/064354, filed on Jul. 20, 2007.

(51) Int. Cl.
  *H04M 11/04* (2006.01)
  *H04B 1/38* (2006.01)

(52) U.S. Cl.
  USPC .............. 455/404.1; 455/404.2; 455/557; 455/558; 379/37

(58) Field of Classification Search
  USPC ...................................... 455/404.1
  See application file for complete search history.

(56) References Cited

U.S. PATENT DOCUMENTS

| | | | |
|---|---|---|---|
| 6,070,065 A | 5/2000 | Armbruster et al. | |
| 2002/0142805 A1* | 10/2002 | Pecen et al. | 455/558 |
| 2004/0192251 A1 | 9/2004 | Zhao et al. | |
| 2005/0227666 A1* | 10/2005 | Cheng | 455/404.1 |
| 2006/0058005 A1 | 3/2006 | Dolezal et al. | |
| 2007/0173224 A1* | 7/2007 | Buckley et al. | 455/404.1 |

FOREIGN PATENT DOCUMENTS

| | | |
|---|---|---|
| EP | 1 073 298 | 1/2001 |
| JP | 10-209942 | 8/1998 |
| JP | 2001-45553 | 2/2001 |
| JP | 2003-526296 | 9/2003 |
| JP | 2006-522549 | 9/2006 |
| WO | 01/67796 | 9/2001 |
| WO | 02/080499 | 10/2002 |

OTHER PUBLICATIONS

International Search Report dated Nov. 13, 2007, from the corresponding International Application.
Extended European Search Report dated Mar. 15, 2013 from the corresponding European Patent Application No. 07791091.7.

* cited by examiner

*Primary Examiner* — Huy C Ho
(74) *Attorney, Agent, or Firm* — Katten Muchin Rosenman LLP

(57) ABSTRACT

A mobile communication base station transmits broadcast information containing emergency call code information to a mobile terminal with the status "Camped on any cell" defined in the 3GPP specification "TS25.304". Upon receiving the broadcast information, the mobile terminal acquires emergency call code information from the broadcast information. The status "Camped on any cell" means that a status in which an IC card is uninserted and the mobile terminal is communicable with the mobile communication base station from the perspective of radio wave strength or a status in which an IC card is inserted, the mobile terminal is communicable with the mobile communication base station from the perspective of radio wave strength, and an Attach or location registration to an MSC via the mobile communication base station and an RNC fails.

4 Claims, 17 Drawing Sheets

FIG.3

| Master Information Block | | |
|---|---|---|
| Other information elements | | |
| | MIB Value tag | |
| CN information elements | | |
| | Supported PLMN types | |
| | PLMN Identity | |
| ANSI-41 Information elements | | |
| | ANSI-41 Core Network Information | |
| Emergency Call Code Information | | |
| | 911 | |
| | 922 | |
| | ⋮ | |
| | 9nn | |
| References to other system information blocks and scheduling blocks | | |

FIG.5A

EMERGENCY CALL CODE
STORAGE UNIT

| EMERGENCY CALL CODE INFORMATION |
|---|
| 110 |
| 119 |
| ⋮ |

FIG.5B

FIRST EMERGENCY CALL
CODE STORAGE UNIT

| EMERGENCY CALL CODE INFORMATION |
|---|
| 911 |
| 922 |
| ⋮ |

FIG.5C

SECOND EMERGENCY CALL
CODE STORAGE UNIT

| EMERGENCY CALL CODE INFORMATION |
|---|
| 911 |
| 922 |
| ⋮ |

FIG.5D

DEFAULT EMERGENCY CALL
CODE STORAGE UNIT

| EMERGENCY CALL CODE INFORMATION |
|---|
| 110 |
| 119 |
| ⋮ |

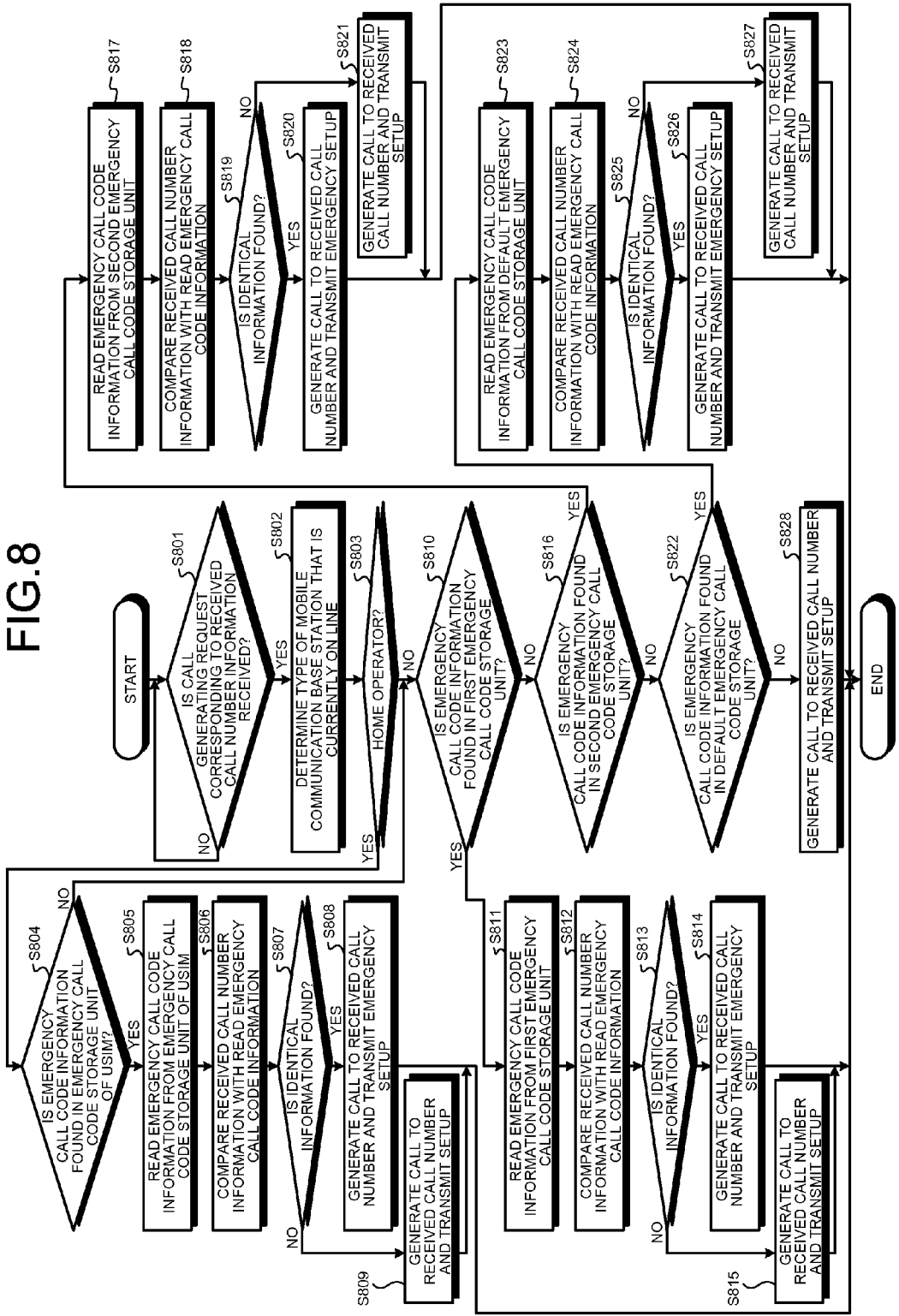

FIG.9A

EMERGENCY CALL CODE
STORAGE UNIT

| EMERGENCY CALL CODE INFORMATION |
|---|
| 110 |
| 119 |
| ⋮ |
| MOBILE COUNTRY CODE INFORMATION |
| 440 |

FIG.9B

FIRST EMERGENCY CALL
CODE STORAGE UNIT

| EMERGENCY CALL CODE INFORMATION |
|---|
| 911 |
| 922 |
| ⋮ |
| MOBILE COUNTRY CODE INFORMATION |
| 310 |

FIG.9C

SECOND EMERGENCY CALL CODE STORAGE UNIT

| EMERGENCY CALL CODE INFORMATION |
|---|
| 911 |
| 922 |
| ⋮ |
| MOBILE COUNTRY CODE INFORMATION |
| 310 |

FIG.9D

DEFAULT EMERGENCY CALL CODE STORAGE UNIT

| EMERGENCY CALL CODE INFORMATION |
|---|
| 110 |
| 119 |
| ⋮ |
| MOBILE COUNTRY CODE INFORMATION |
| 440 |

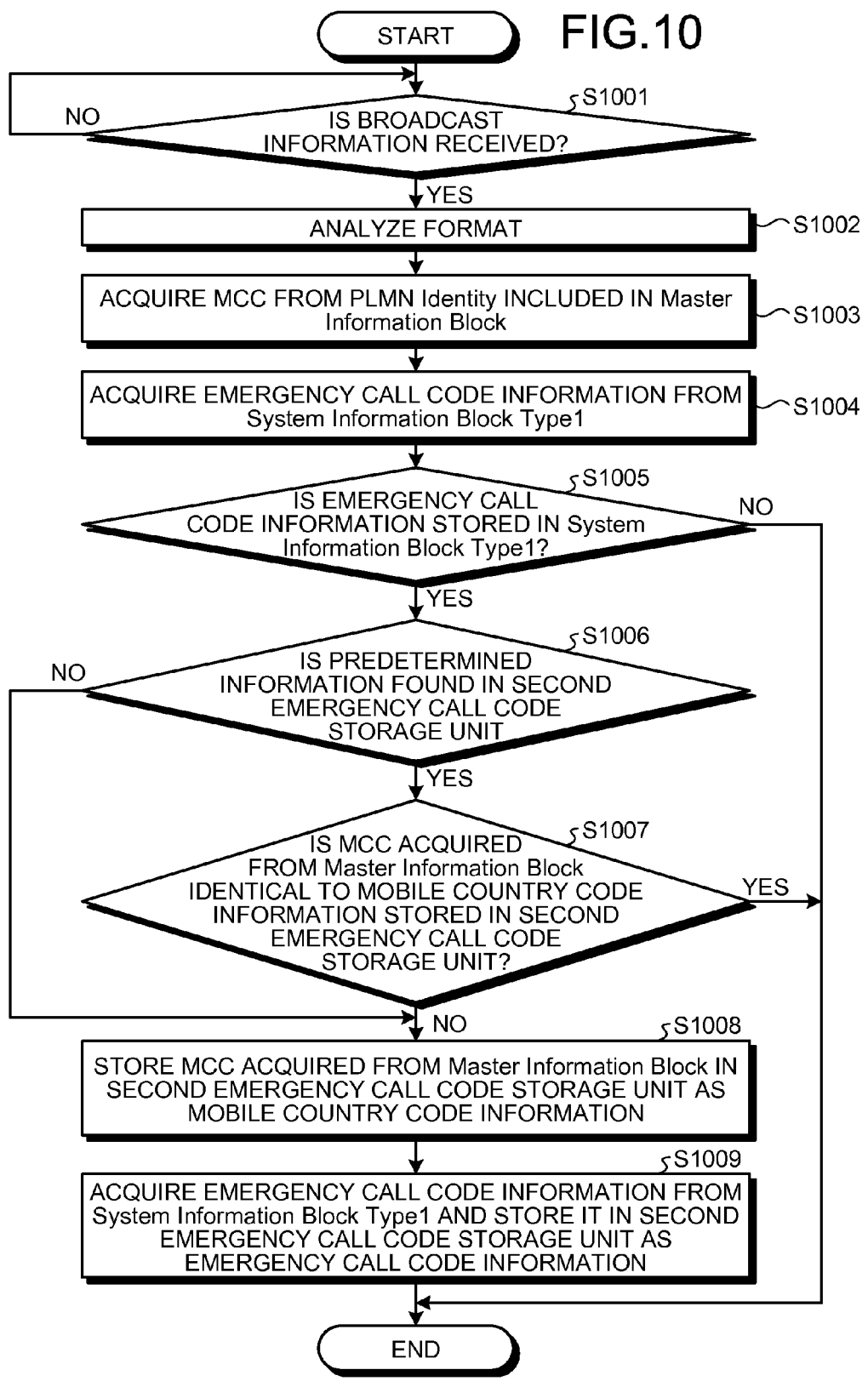

FIG.14

| System Information Block Type5 | |
|---|---|
| SIB6 Indicator | |
| PhyCH information elements | |
| | PICH Power offset |
| | CHOICE mode |
| | . . . |
| | Secondary CCPCH system information |
| | CBS DRX Level 1 information |
| Emergency Call Code Information | |
| | 911 |
| | 922 |
| | . . . |
| | 9nn |

FIG.15

| System Information Block Type7 | | | |
|---|---|---|---|
| CHOICE mode | | | |
| | FDD | | |
| | | UL interference | |
| | TDD | | |
| PhyCH information elements | | | |
| | PRACHs listed in system information block type 5 | | |
| | | Dynamic persistence level | |
| | PRACHs listed in system information block type 6 | | |
| | | Dynamic persistence level | |
| | Expiration Time Factor | | |
| Emergency Call Code Information | | | |
| | 911 | | |
| | 922 | | |
| | ... | | |
| | 9nn | | |

FIG.16

| System Information Block Type11 | | |
|---|---|---|
| SIB12 Indicator | | |
| Measurement information elements | | |
| | FACH measurement occasion info | |
| | Measurement control system information | |
| Emergency Call Code Information | | |
| | 911 | |
| | 922 | |
| | ... | |
| | 9nn | |

FIG.17

| System Information Block Type19 | |
|---|---|
| Emergency Call Code Information | |
| | 911 |
| | 922 |
| | ... |
| | 9nn |

FIG.18

| Bytes | Description | Length |
|---|---|---|
| 1 TO 3 | Emergency Call Code | 3 Bytes |
| 4 TO X + 3 | Emergency Call Code Alpha Identifier | X Bytes |
| X + 4 | Emergency Service Category | 1 byte |

EMERGENCY CALL CODE INFORMATION ACQUIRING SYSTEM

CROSS-REFERENCE TO RELATED APPLICATION(S)

This application is a continuation of International Application No. PCT/JP2007/064354, filed on Jul. 20, 2007, the entire contents of which are incorporated herein by reference.

FIELD

The embodiments discussed herein are directed to an emergency call code information acquiring system that includes a mobile communication base station that transmits broadcast information, which is information to be broadcasted as a service, and a terminal device that receives the broadcast information.

BACKGROUND

Typical mobile terminals and USIM ((Universal Subscriber Identity Module) or SIM (Subscriber Identity Module)) cards to be inserted into the mobile terminals store therein emergency call code information, which is information about the call numbers of emergency agencies, such as the police and fire departments. Such mobile terminals that store therein the emergency call code information include, for example, mobile terminals complying with "Release 99" of the 3GPP (3rd Generation Partnership Project) and successive specifications. The mobile terminal compares call number information, which indicates a call number to be called, with the stored emergency call code information. If they are not identical, the mobile terminal transmits a signal called SETUP to a Mobile-services Switching Centre (MSC) via a mobile communication base station (Node B/Base Transceiver Station (BTS)) and a Radio Network Controller (RNC) to generate a normal call. If they are identical, the mobile terminal transmits a signal called EMERGENCY SETUP to the MSC via the Node B/BTS and the RNC to generate an emergency call.

Most of the mobile terminals and the USIM cards store therein the emergency call code information of the country where the mobile terminals and the USIM cards are sold and the emergency call code information is different from country to country; therefore, the mobile terminal cannot transmit the signal called EMERGENCY SETUP to the mobile communication base station to generate the emergency call in countries other than the country where it is sold.

To solve the problem, a mobile terminal complying with the 3GPP specification "Release 5" receives emergency call code information and the Service Category from the MSC when an Attach is completed (i.e., when receiving an ATTACH ACCEPT) or when location registration is completed (i.e., when receiving a LOCATION UPDATING ACCEPT/ROUTING AREA UPDATE ACCEPT). With this configuration, even if the emergency call code indicated by the emergency call code information stored in the mobile terminal or the USIM card is different from the address of the emergency agency in the country where the mobile terminal is located now, the mobile terminal can generate an emergency call by transmitting the EMERGENCY SETUP signal using the received emergency call code information. The above-described Service Category is emergency-agency based attribute values that are defined in the 3GPP specification "Release 4" as the international standards. As a technology for allowing a mobile terminal to generate an emergency call, Japanese National Publication of International Patent Application No. 2003-526296 discloses a technology to set up, in response to the generation of an emergency call attached with a Service Category, a communication with an emergency agent corresponding to the Service Category on the mobile communication network.

Status transmission of the above-described mobile terminal during a process of selecting a mobile communication base station (Cell Selection/Reselection) is described below. FIG. 19 is a diagram that illustrates the status transmission in the Cell Selection/Reselection defined in the 3GPP specification "TS25.304". As illustrated in the figure, when the mobile terminal is powered with the USIM uninserted, the mobile terminal becomes the status "Any Cell Selection" (see (1) of FIG. 19). If a mobile communication base station that is communicable from the perspective of radio wave strength is found, the mobile terminal shifts from the status "Any Cell Selection" to the status "Camped on any cell" (see (2) of FIG. 19).

If the USIM is inserted into the mobile terminal (see (3) of FIG. 19) and a mobile communication base station that is communicable with the mobile terminal from the perspective of radio wave strength is found, the mobile terminal shifts from the status "Any Cell Selection" to the status "Camped Normally" (see (4) of FIG. 19). However, if the mobile terminal cannot maintain the status normally communicable with the mobile communication base station, the mobile terminal shifts from the status "Camped Normally" back to the status "Any Cell Selection" (see (5) of FIG. 19). Even when the USIM is inserted, if the Attach fails or if the location registration fails, the mobile terminal remains as the status "Any Cell Selection" (see (6) of FIG. 19); however, if the mobile terminal is communicable with a mobile communication base station of a HOME operator, an operator under a roaming contract with the HOME operator, or other operators from the perspective of radio wave strength, the mobile terminal shifts from the status "Any Cell Selection" to the status "Camped on any cell" in the same manner as in the case where a USIM is not inserted (see (7) of FIG. 19).

It means that when the mobile terminal is in the status "Camped Normally", which is the normally communicable status defined in the 3GPP specification "TS25.304", the mobile terminal is notified of the emergency call code information by the MSC.

However, in the above-described technology, there is a problem in that a mobile terminal with the status "Camped on any cell" cannot acquire the emergency call code information.

SUMMARY

According to an aspect of an embodiment of the invention, an emergency call code information acquiring system includes a mobile communication base station that transmits broadcast information that is information to be broadcasted as a service; and a terminal device that receives the broadcast information. The mobile communication base station includes a transmitting unit that transmits broadcast information containing emergency call code information that is information about a call number of an emergency agency, to the terminal device that is either in a first status in which an IC card is uninserted and the terminal device is communicable with the mobile communication base station from the perspective of radio wave strength or in a second status in which the IC card is inserted, the terminal device is communicable with the mobile communication base station from the perspective of radio wave strength, and an Attach or location registration to an MSC via the mobile communication base station and an RNC fails. The terminal device includes an emergency call code information acquiring unit that acquires, when the terminal device receives the broadcast information transmitted by the transmitting unit of the mobile communication base station in either the first status or the second status, the emergency call code information contained in the received broadcast information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram that explains how emergency call code information is stored in the format called Master Information Block;

FIG. 5A is a diagram that illustrates an example of information stored in an emergency call code storage unit;

FIG. 5B is a diagram that illustrates an example of information stored in a first emergency call code storage unit;

FIG. 5C is a diagram that illustrates an example of information stored in a second emergency call code storage unit;

FIG. 5D is a diagram that illustrates an example of information in a default emergency call code storage unit;

FIG. 8 is a flowchart of a call generating process performed by the mobile terminal;

FIG. 9A is a diagram that illustrates an example of information stored in the emergency call code storage unit;

FIG. 9B is a diagram that illustrates an example of information stored in the first emergency call code storage unit;

FIG. 9C is a diagram that illustrates an example of information stored in the second emergency call code storage unit;

FIG. 9D is a diagram that illustrates an example of information stored in the default emergency call code storage unit;

FIG. 10 is a flowchart of an emergency call code information acquiring process according to a second embodiment;

FIG. 14 is a diagram that explains how the emergency call code information is stored in the format called System Information Block Type 5;

FIG. 15 is a diagram that explains how the emergency call code information is stored in the format called System Information Block Type 7;

FIG. 16 is a diagram that explains how the emergency call code information is stored in the format called System Information Block Type11;

FIG. 17 is a diagram that explains how the emergency call code information is stored in the format called System Information Block Type19;

FIG. 18 is a diagram of a storage format defined in the 3GPP specification "TS31.102"

DESCRIPTION OF EMBODIMENTS

Preferred embodiments of the present invention will be explained with reference to accompanying drawings. The outline and features of the emergency call code information acquiring system according to the present invention, the configuration of and processes performed by a mobile communication base-station device and a mobile terminal included in the emergency call code information acquiring system are described below in the order they appear in this sentence. After the effects of the first embodiment are described, another embodiment will be described as the second embodiment.

[a] First Embodiment

Description of Terms

First of all, the key terms used in the following embodiments are described below. "Announcement information" is various information to be transmitted from a mobile communication base-station device to a mobile terminal. In the following embodiments, the mobile communication base-station device stores the various information in a format called System Information Blocks defined in the 3GPP specification "TS25.331" and transmits the format to the mobile terminal. The total number of formats defined in the 3GPP specification "TS25.331" is nineteen and they includes Master Information Block and System Information Block Type1 to System Information Block Type18.

An "IC card" is a device that stores therein information necessary to operate the mobile terminal (e.g., the phone number information and the user ID). The IC card is, for example, a USIM card or a SIM card. In status transition concerning Cell Selection/Reselection defined in the 3GPP specification "TS25.304", when the mobile terminal is powered with the USIM card uninserted, the mobile terminal becomes the status "Any Cell Selection" and then shifts, when a mobile communication base station that is communicable from the perspective of radio wave strength is found, from the status "Any Cell Selection" to the status "Camped on any cell". Even when the USIM is inserted, if the Attach fails or if the location registration fails, the mobile terminal becomes the status "Any Cell Selection"; however, if the mobile terminal is communicable with a mobile communication base station of a HOME operator, an operator under a roaming contract with the HOME operator, or other operators from the perspective of radio wave strength, the mobile terminal shifts from the status "Any Cell Selection" to the status "Camped on any cell" in the same manner as in the case where a USIM is not inserted.

Outline and Features of Emergency Call Code Information Acquiring System

Figure 1:
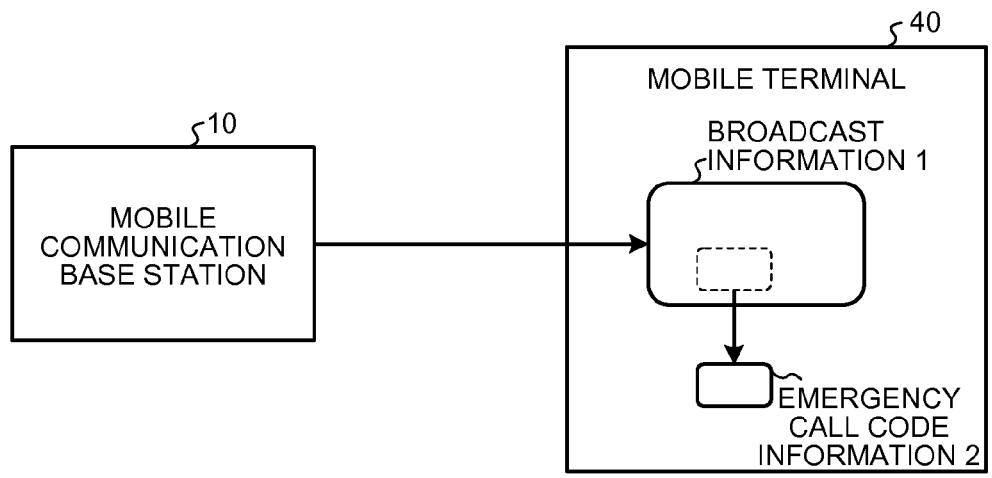
FIG. 1 is a diagram that explains the outline and features of an emergency call code information acquiring system according to a first embodiment.

The outline and features of the emergency call code information acquiring system according to the first embodiment is described with reference to FIG. 1. FIG. 1 is a diagram that explains the outline and features of the emergency call code information acquiring system according to the first embodiment.

The emergency call code information acquiring system according to the first embodiment includes an mobile communication base-station device that transmits the broadcast information, which is information to be broadcasted as a service, and a mobile terminal that receives the broadcast information, in brief. The main feature is that a mobile terminal with the status "Camped on any cell" can acquire the emergency call code information.

The main feature is described in detail below. In the emergency call code information acquiring system, the mobile communication base station transmits broadcast information containing the emergency call code information, which is information about the call numbers of the emergency agencies, to the mobile terminal that is either in a status in which an IC card is uninserted and the mobile terminal is communicable with the mobile communication base station from the perspective of the radio wave strength or in a status in which an IC card is inserted, the mobile terminal is communicable with the mobile communication base station from the perspective of the radio wave strength, and the Attach or the location registration to the MSC via the mobile communication base station and the RNC fails. More specifically, as illustrated in FIG. 1, a mobile communication base station 10 transmits broadcast information 1 containing the emergency call code information to a mobile terminal 40 with the status "Camped on any cell" defined in the 3GPP specification "TS25.304".

When the mobile terminal receives the broadcast information from the mobile communication base station either in a status in which an IC card is uninserted and the mobile terminal is communicable with the mobile communication base station from the perspective of the radio wave strength or in a status in which an IC card is inserted, the mobile terminal is communicable with the mobile communication base station from the perspective of the radio wave strength, and the Attach or the location registration to the MSC via the mobile communication base station and the RNC fails, the mobile terminal acquires the emergency call code information from the received broadcast information. More specifically, as illustrated in FIG. 1, the mobile terminal 40 that is in the status "Camped on any cell" defined in the 3GPP specification "TS25.304" receives the broadcast information 1 from the mobile communication base station 10 and acquires emergency call code information 2 from the broadcast information 1.

In this manner, the emergency call code information acquiring system according to the first embodiment implements the above-described main feature, i.e., allows a mobile terminal with the status "Camped on any cell" to acquire the emergency call code information.

Configuration of Movable Communication Base-Station Device

Figure 2:
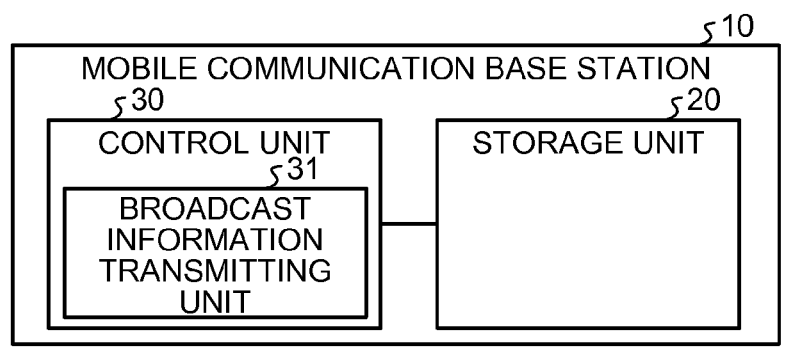
FIG. 2 is a block diagram of the configuration of a mobile communication base station in the emergency call code information acquiring system according to the first embodiment.

The configuration of the mobile communication base station 10 in the emergency call code information acquiring system according to the first embodiment is described below with reference to FIG. 2. FIG. 2 is a block diagram of the configuration of the mobile communication base station 10 in the emergency call code information acquiring system according to the first embodiment. As illustrated in the figure, the mobile communication base station 10 includes a storage unit 20 and a control unit 30.

The storage unit 20 stores therein data that is used in various processes performed by the control unit 30. More particularly, the storage unit 20 stores therein the broadcast information and the emergency call code information to be transmitted by a later-described broadcast information transmitting unit 31.

The control unit 30 is a processor that stores programs that specify procedures and control data in an internal memory and performs various processes using these data. The control unit 30 includes the broadcast information transmitting unit 31 as a unit that closely related to the present invention. The broadcast information transmitting unit 31 corresponds to the "transmitting unit" described in the CLAIMS.

The broadcast information transmitting unit 31 transmits the broadcast information containing the emergency call code information, which is information about the call numbers of the emergency agents, to the mobile terminal that is either in a status in which an IC card is uninserted and the mobile terminal is communicable with the mobile communication base station from the perspective of the radio wave strength or in a status in which an IC card is inserted, the mobile terminal is communicable with the mobile communication base station from the perspective of the radio wave strength, and the Attach or the location registration to the MSC via the mobile communication base station and the RNC fails.

More particularly, when an administrator turns on the power switch of the mobile communication base station 10, the broadcast information transmitting unit 31 reads the broadcast information and the emergency call code information from the storage unit 20, stores the read broadcast information and the read emergency call code information in a format called System Information Blocks, and transmits the information.

For example, as illustrated in FIG. 3, the broadcast information transmitting unit 31 adds a segment "Emergency Call Code Information" to the Master Information Block, which is a format of the System Information Blocks, stores "911" or the like as the emergency call code information in the segment, and transmits the information. FIG. 3 is a diagram that explains how the emergency call code information is stored in the format called Master Information Block.

Configuration of Mobile Terminal

Figure 4:
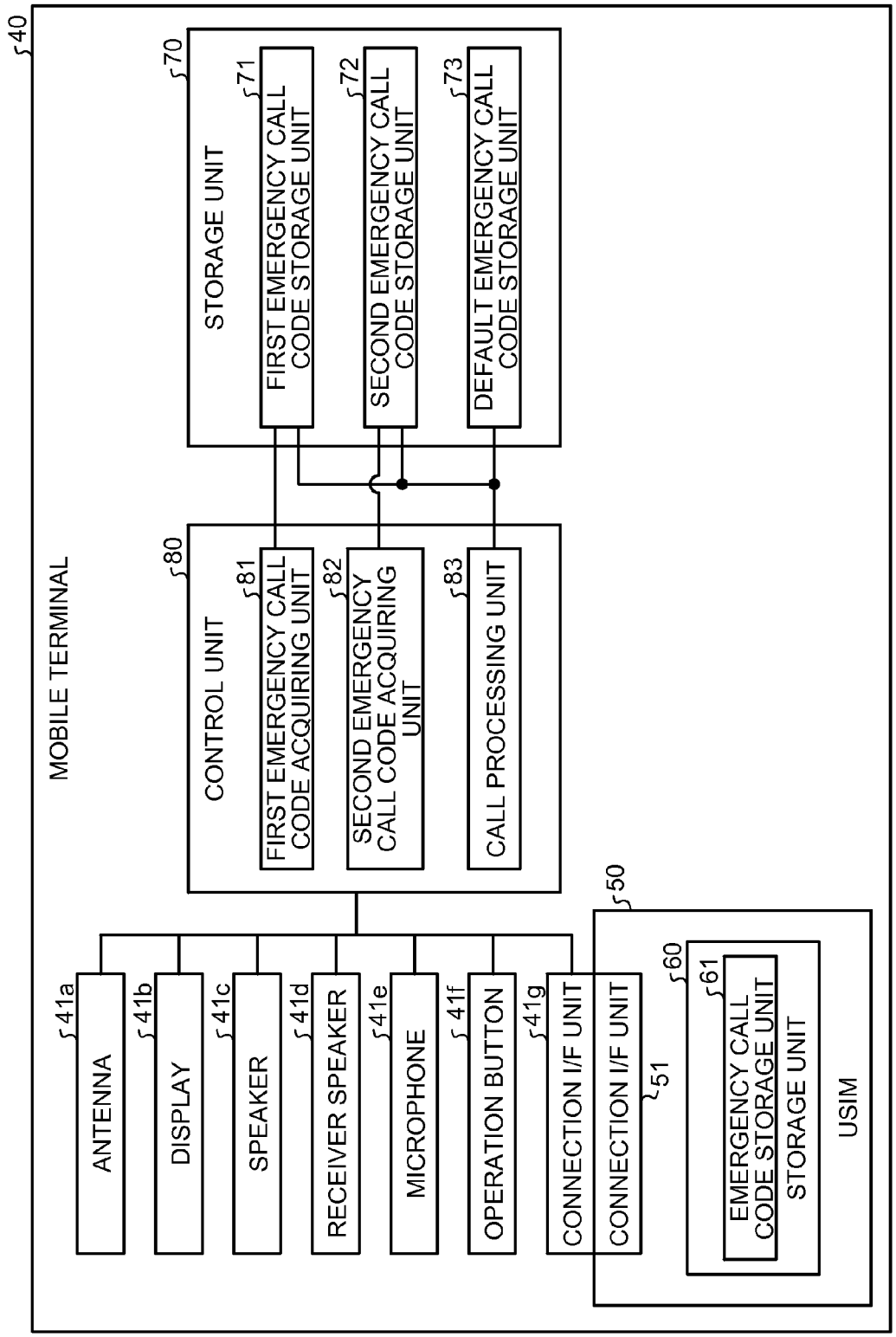
FIG. 4 is a block diagram of the configuration of a mobile terminal in the emergency call code information acquiring system according to the first embodiment.

The configuration of the mobile terminal 40 in the emergency call code information acquiring system according to the first embodiment is described below with reference to FIG. 4. FIG. 4 is a block diagram of the configuration of the mobile terminal 40. As illustrated in the figure, the mobile terminal 40 includes an antenna 41a, a display 41b, a speaker 41c, a receiver speaker 41d, a microphone 41e, an operation button 41f, a connection I/F unit 41g, a USIM 50, a storage unit 70, and a control unit 80.

The antenna 41a transmits or receives radio waves. The display 41b displays an image that is a result of processes performed by the control unit 80. The speaker 41c generates a ring alert or an announce alert by converting electric signals into physical vibrations. The receiver speaker 41d produces voice of the person across the line. The microphone 41e converts physical vibrations caused by voice into electric signals. The operation button 41f outputs various information or user requests to the control unit 80 according to received pushes. The connection I/F unit 41g is physically connected to the USIM 50, thereby allowing communications between the mobile terminal 40 and the USIM 50.

The USIM 50 includes a connection I/F unit 51 and a storage unit 60. The USIM 50 is physically connected to the mobile terminal 40 via the connection I/F unit 51, thereby allowing communications with the mobile terminal 40. The storage unit 60 stores therein contract information that is used for the mobile terminal 40 to provide users with communication services. The storage unit 60 includes an emergency call code storage unit 61 as a unit closely related to the present invention.

The emergency call code storage unit 61 stores therein the emergency call code information. More particularly, the emergency call code storage unit 61 stores therein emergency call code information that has been pre-stored at the manufacture of the USIM 50 as illustrated in FIG. 5A. For example, the emergency call code storage unit 61 stores therein "110" as the emergency call code information as illustrated in FIG. 5A. FIG. 5A is a diagram that illustrates an example of information stored in the emergency call code storage unit 61.

The storage unit 70 stores therein data that is used in various processes performed by the control unit 80. The storage unit 70 includes a first emergency call code storage unit 71, a second emergency call code storage unit 72, and a default emergency call code storage unit 73 as units closely related to the present invention.

The first emergency call code storage unit 71 stores therein the emergency call code information. More particularly, as illustrated in FIG. 5B, the first emergency call code storage unit 71 stores therein emergency call code information that has been stored by a later-described first emergency call code acquiring unit 81. For example, the first emergency call code storage unit 71 stores therein "911" as the emergency call code information as illustrated in FIG. 5B. FIG. 5B is a diagram that illustrates an example of information stored in the first emergency call code storage unit 71.

The second emergency call code storage unit 72 stores therein the emergency call code information. More particularly, as illustrated in FIG. 5C, the second emergency call code storage unit 72 stores therein emergency call code information that has been stored by a later-described second emergency call code acquiring unit 82. For example, the second emergency call code storage unit 72 stores therein "911" as the emergency call code information as illustrated in FIG. 5C. FIG. 5C is a diagram that illustrates an example of information stored in the second emergency call code storage unit 72.

The default emergency call code storage unit 73 stores therein the emergency call code information. More particularly, the default emergency call code storage unit 73 stores therein emergency call code information that has been pre-stored at the manufacture of the mobile terminal 40. For example, the default emergency call code storage unit 73 stores therein "119" as the emergency call code information as illustrated in FIG. 5D. FIG. 5D is a diagram that illustrates an example of information in the default emergency call code storage unit 73.

The control unit 80 is a processor that stores programs that specify procedures and control data in an internal memory and performs various processes using these data. The control unit 80 includes the first emergency call code acquiring unit 81, the second emergency call code acquiring unit 82, and a call processing unit 83 as units that closely related to the present invention. The second emergency call code acquiring unit 82 corresponds to the "emergency call code information acquiring unit" described in the CLAIMS.

The first emergency call code acquiring unit 81 acquires the emergency call code information. More particularly, when the mobile terminal 40 that is in the status "Camped normally" defined in the 3GPP specification "TS25.304" receives the emergency call code information from the mobile communication base station 10, the first emergency call code acquiring unit 81 stores the received emergency call code information in the first emergency call code storage unit 71. For example, the first emergency call code acquiring unit 81 receives the emergency call code information "911" and so on and stores them in the first emergency call code storage unit 71.

When the mobile terminal 40 receives the emergency call code information from the mobile communication base station 10 either in a status in which the USIM 50 is uninserted and the mobile terminal 40 is communicable with the mobile communication base station 10 from the perspective of the radio wave strength or in a status in which the USIM 50 is inserted, the mobile terminal 40 is communicable with the mobile communication base station 10 from the perspective of the radio wave strength, and the Attach or the location registration to the MSC via the mobile communication base station and the RNC fails, the second emergency call code acquiring unit 82 acquires the emergency call code information from the received broadcast information. More particularly, when the mobile terminal 40 that is in the status "Camped on any cell" defined in the 3GPP specification "TS25.304" receives various broadcast information included in the format called System Information Block from the mobile communication base station 10, the second emergency call code acquiring unit 82 analyzes the structure of the format, extracts, if the emergency call code information is found, the emergency call code information, and stores the emergency call code information in the second emergency call code storage unit 72. For example, the second emergency call code acquiring unit 82 extracts the emergency call code information "911" and so on from the segment "Emergency Call Code Information", which is the additional segment of the Master Information Block, and stores the emergency call code information in the second emergency call code storage unit 72.

The call processing unit 83 controls the antenna 41a, the receiver speaker 41d, the microphone 41e, the operation button 41f, and the like, thereby providing the user with telephone functions. More particularly, the call processing unit 83 receives the call number information and a call generating request from the user according to pushes of the operation button 41f, the call processing unit 83 reads the emergency call code information from any of the emergency call code storage unit 61, the first emergency call code storage unit 71, the second emergency call code storage unit 72, and the default emergency call code storage unit 73. After that, the call processing unit 83 compares the received call number information with the read emergency call code information. If they are not identical to each other, the call processing unit 83 generates a normal call using the call number information and transmits a signal called SETUP to the MSC via the mobile communication base station 10 and the RNC. If they are identical, the call processing unit 83 generates an emergency call using the call number information and transmits a signal called EMERGENCY SETUP to the MSC via the B/BTS and the RNC. The processes performed by the call processing unit 83 will be described in detail later with reference to a flowchart.

Processes Performed by Movable Communication Base-Station Device

Figure 6:
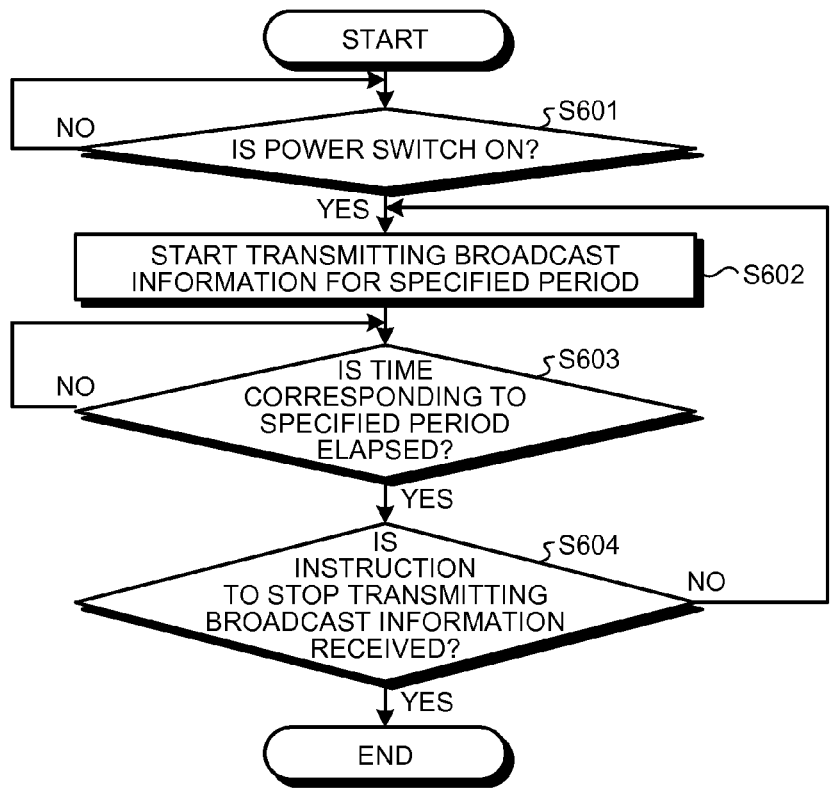
FIG. 6 is a flowchart of a broadcast-information transmitting process performed by the mobile communication base station.

Processes performed by the mobile communication base station 10 are described below with reference to FIG. 6. FIG. 6 is a flowchart of a broadcast-information transmitting process performed by the mobile communication base station 10.

As illustrated in FIG. 6, when the administrator turns on the power switch (Yes at Step S601), the mobile communication base station 10 starts transmitting the broadcast information included in the predetermined format for a specified period (Step S602) and continues it until an instruction to stop the transmitting the broadcast information is received (Steps S602 to S604).

Processes Performed by Mobile Terminal

Figure 7:
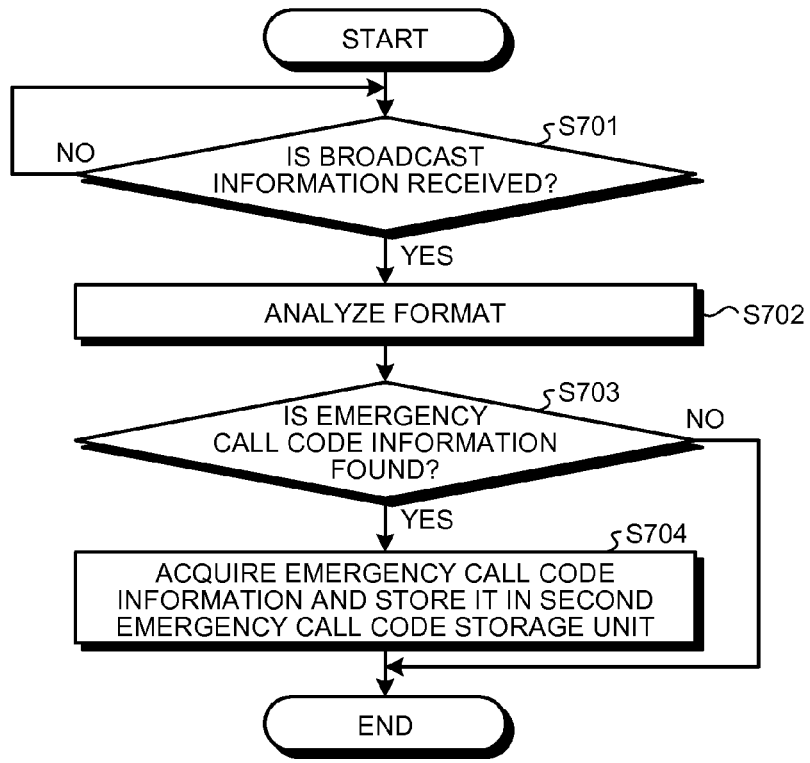
FIG. 7 is a flowchart of an emergency call code information acquiring process performed by the mobile terminal.

Processes performed by the mobile terminal 40 are described below with reference to FIGS. 7 and 8. FIG. 7 is a flowchart of an emergency call code information acquiring process performed by the mobile terminal 40. FIG. 8 is a flowchart of a call generating process performed by the mobile terminal 40.

Emergency Call Code Information Acquiring Process

As illustrated in FIG. 7, when the mobile terminal 40 receives various broadcast information from the mobile communication base station 10 (Yes at Step S701), the second emergency call code acquiring unit 82 analyzes the format that includes the various broadcast information (Step S702). If the emergency call code information is found (Yes at Step S703), the second emergency call code acquiring unit 82 extracts the emergency call code information and stores the emergency call code information in the second emergency call code storage unit 72 (Step S704) and the process control goes to end.

Call Generating Process

As illustrated in FIG. 8, when the call processing unit 83 receives a call generating request corresponding to predetermined call number information via the operation button 41f (Yes at Step S801), the mobile terminal 40 determines the type of the mobile communication base station 10 that is currently on line (the HOME operator or the others) (Step S802). If it is the HOME operator (Yes at Step S803), the mobile terminal 40 makes a communication with the USIM 50 and checks whether the emergency call code information is stored in the emergency call code storage unit 61 (Step S804). If the emergency call code information is stored in the emergency call code storage unit 61 (Yes at Step S804), the mobile terminal 40 reads the emergency call code information from the emergency call code storage unit 61 of the USIM 50 (Step S805) and compares the received call number information with the read emergency call code information (Step S806). If identical information is found (Yes at Step S807), the mobile terminal 40 generates the emergency call using the call number information and transmits the signal called EMERGENCY SETUP (Step S808). If no identical information is found (No at Step S807), the mobile terminal 40 generates the normal call using the call number information and transmits the signal called SETUP (Step S809).

If it is determined at Step S803 that it is not the HOME operator (No at Step S803) or if it is determined at Step S804 that no emergency call code information is stored in the emergency call code storage unit 61 (No at Step S804), the mobile terminal 40 checks whether the emergency call code information is stored in the first emergency call code storage unit 71 (Step S810). If the emergency call code information is stored in the first emergency call code storage unit 71 (Yes at Step S810), the mobile terminal 40 reads the emergency call code information from the first emergency call code storage unit 71 (Step S811) and compares the received call number information with the read emergency call code information (Step S812). If identical information is found (Yes at Step S813), the mobile terminal 40 generates the emergency call using the call number information and transmits the signal called EMERGENCY SETUP (Step S814). If no identical information is found (No at Step S813), the mobile terminal 40 generates the normal call using the call number information and transmits the signal called SETUP (Step S815).

If it is determined at Step S810 that no emergency call code information is stored in the first emergency call code storage unit 71 (No at Step S810), the mobile terminal 40 checks whether the emergency call code information is stored in the second emergency call code storage unit 72 (Step S816). If the emergency call code information is stored in the second emergency call code storage unit 72 (Yes at Step S816), the mobile terminal 40 reads the emergency call code information from the second emergency call code storage unit 72 (Step S817) and compares the received call number information with the read emergency call code information (Step S818). If identical information is found (Yes at Step S819), the mobile terminal 40 generates the emergency call using the call number information and transmits the signal called EMERGENCY SETUP (Step S820). If no identical information is found (No at Step S819), the mobile terminal 40 generates the normal call using the call number information and transmits the signal called SETUP (Step S821).

If it is determined at Step S816 that no emergency call code information is stored in the second emergency call code storage unit 72 (No at Step S816), the mobile terminal 40 checks whether the emergency call code information is stored in the default emergency call code storage unit 73 (Step S822). If the emergency call code information is stored in the default emergency call code storage unit 73 (Yes at Step S822), the mobile terminal 40 reads the emergency call code information from the default emergency call code storage unit 73 (Step S823) and compares the received call number information with the read emergency call code information (Step S824). If identical information is found (Yes at Step S825), the mobile terminal 40 generates the emergency call using the call number information and transmits the signal called EMERGENCY SETUP (Step S826). If no identical information is found (No at Step S825), the mobile terminal 40 generates the normal call using the call number information and transmits the signal called SETUP (Step S827).

If it is determined at Step S822 that no emergency call code information is stored in the default emergency call code storage unit 73 (No at Step S822), the mobile terminal 40 generates the normal call using the call number information and transmits the signal called SETUP (Step S828) and the process control goes to end.

Effects of First Embodiment

As described above, the mobile communication base station according to the first embodiment transmits broadcast information containing the emergency call code information, which is information about the call numbers of the emergency agents, to a mobile terminal with the status "Camped on any cell" defined in the 3GPP specification "TS25.304". Upon receiving the broadcast information from the mobile communication base station, the mobile terminal acquires the emergency call code information from the received broadcast information. With this configuration, a mobile terminal with the status "Camped on any cell" can acquire the emergency call code information.

[b] Second Embodiment

Although the mobile terminal according to the first embodiment stores therein only the emergency call code information, a mobile terminal according to the second embodiment stores therein both the emergency call code information and a country code for mobile communications (hereinafter, Mobile Country Code (MCC)).

The MCC can be acquired from PLMN Identity that is a part of the segment "CN information elements" in the Master Information Block illustrated in FIG. 3. The presence of the MCC in the second embodiment makes it possible to describe the present invention with an example close to the actual implementation. The configuration, the fundamental operation, and the fundamental functions of the units in the mobile terminal according to the second embodiment are the same as those in the first embodiment; therefore, only the mobile terminal is described below with reference to the same block diagram illustrated in FIG. 4.

The emergency call code storage unit 61 stores therein both the emergency call code information and mobile country code information. More specifically, the emergency call code storage unit 61 stores therein both various emergency call code information, such as the emergency call code information "110", and the mobile country code information "440" as illustrated in FIG. 9A. Information that is present in the emergency call code storage unit 61 is data pre-stored at the manufacture of the USIM 50. FIG. 9A is a diagram that illustrates an example of information stored in the emergency call code storage unit 61.

The first emergency call code storage unit 71 stores therein both the emergency call code information and the mobile country code information. More specifically, the first emergency call code storage unit 71 stores therein both various emergency call code information, such as the emergency call code information "911", and the mobile country code information "310" as illustrated in FIG. 9B. The emergency call code information and the mobile country code information are received from the mobile communication base station 10 and stored in the first emergency call code storage unit 71 by the first emergency call code acquiring unit 81. FIG. 9B is a diagram that illustrates an example of information stored in the first emergency call code storage unit 71.

The second emergency call code storage unit 72 stores therein both the emergency call code information and the mobile country code information. More specifically, the second emergency call code storage unit 72 stores therein both various emergency call code information, such as the emergency call code information "911", and the mobile country code information "310" as illustrated in FIG. 9C. The emergency call code information and the mobile country code information are stored in the second emergency call code storage unit 72 by the second emergency call code acquiring unit 82, which will be described in detail later with reference to the flowchart illustrated in FIG. 10. FIG. 9C is a diagram that illustrates an example of information stored in the second emergency call code storage unit 72.

The default emergency call code storage unit 73 stores therein both the emergency call code information and the mobile country code information. More specifically, the default emergency call code storage unit 73 stores therein both various emergency call code information, such as the emergency call code information "110", and the mobile country code information "440" as illustrated in FIG. 9D. Information that is present in the default emergency call code storage unit 73 is data pre-stored at the manufacture of the mobile terminal 40. FIG. 9D is a diagram that illustrates an example of information stored in the default emergency call code storage unit 73.

Processes Performed by Mobile Terminal

Figure 11:
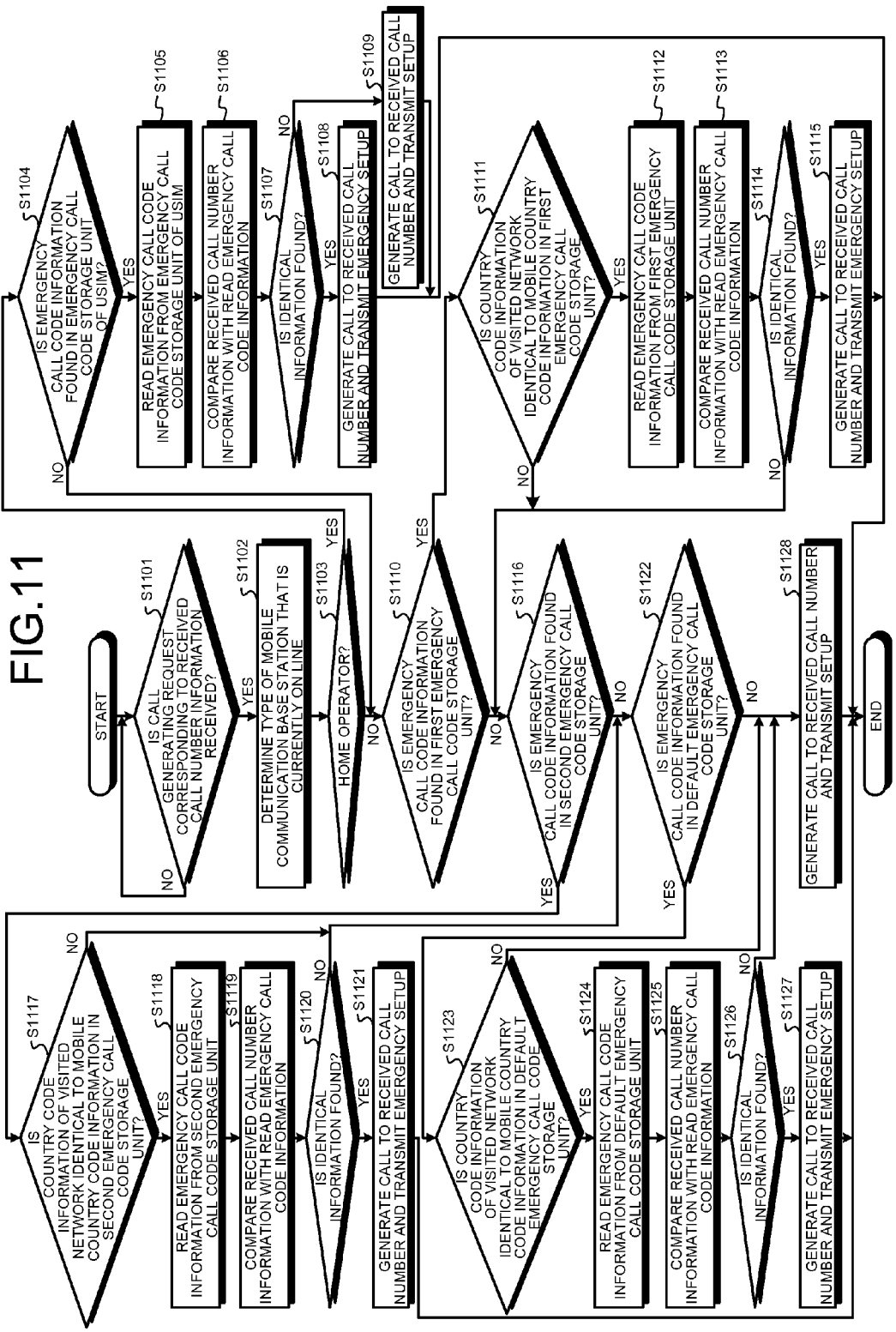
FIG. 11 is a flowchart of a call generating process according to the second embodiment.

Processes performed by the mobile terminal 40 according to the second embodiment are described below with reference to FIGS. 10 and 11. FIG. 10 is a flowchart of an emergency call code information acquiring process according to the second embodiment. FIG. 11 is a flowchart of a call generating process according to the second embodiment.

Emergency Call Code Information Acquiring Process

As illustrated in FIG. 10, when the mobile terminal 40 receives various broadcast information from the mobile communication base station 10 (Yes at Step S1001), the second emergency call code acquiring unit 82 analyzes the format that includes the various broadcast information (Step S1002).

The second emergency call code acquiring unit 82 acquires the MCC from the PLMN Identity included in the Master Information Block (Step S1003) and tries to acquire the emergency call code information from, for example, the System Information Block Type1 (Step S1004).

If the emergency call code information is stored in the System Information Block Type1 (Yes at Step S1005), the second emergency call code acquiring unit 82 accesses the second emergency call code storage unit 72 and checks whether the predetermined information has already been stored in the second emergency call code storage unit 72 (Step S1006).

If no information is stored in the second emergency call code storage unit 72 (No at Step S1006), the second emergency call code acquiring unit 82 writes the MCC that is acquired from the Master Information Block to the second emergency call code storage unit 72 as the mobile country code information (Step S1008), acquires the emergency call code information from the System Information Block Type1, and writes the acquired information to the second emergency call code storage unit 72 as the emergency call code information (Step S1009).

On the other hand, if the predetermined information is stored in the second emergency call code storage unit 72 (Yes at Step S1006), the second emergency call code acquiring unit 82 compares the mobile country code information stored in the second emergency call code storage unit 72 with the MCC acquired from the Master Information Block (Step S1007).

If they are not identical (No at Step S1007), the second emergency call code acquiring unit 82 writes the MCC acquired from the Master Information Block to the second emergency call code storage unit 72 as the mobile country code information (Step S1008), acquires the emergency call code information from the System Information Block Type1, and writes the acquired information to the second emergency call code storage unit 72 as the emergency call code information (Step S1009), and the process control goes to end. If they are identical (Yes at Step S1007), the second emergency call code acquiring unit 82 determines that the information is not updated and the process control goes to end. Because the government scarcely changes the emergency call codes, if the MCCs are identical, it is assumed that the acquired emergency call code information is identical to the stored emergency call code information. If it is determined at Step S1005 that no emergency call code information is stored in the System Information Block Type1 (No at Step S1005), the process control can go to a process of trying to acquire the emergency call code information from another type. The description about this process is omitted.

Call Generating Process

As illustrated in FIG. 11, when the call processing unit 83 receives a call generating request corresponding to predetermined call number information via the operation button 41f (Yes at Step S1101), the mobile terminal 40 determines the type of the mobile communication base station 10 that is currently on line (the HOME operator or the others) (Step S1102). If it is the HOME operator (Yes at Step S1103), the mobile terminal 40 makes a communication with the USIM 50 and checks whether the emergency call code information is stored in the emergency call code storage unit 61 (Step S1104). If the emergency call code information is stored in the emergency call code storage unit 61 (Yes at Step S1104), the mobile terminal 40 reads the emergency call code information from the emergency call code storage unit 61 of the USIM 50 (Step S1105) and compares the received call number information with the read emergency call code information (Step S1106). If identical information is found (Yes at Step S1107), the mobile terminal 40 generates the emergency call using the call number information and transmits the signal called EMERGENCY SETUP (Step S1108). If no identical information is found (No at Step S1107), the mobile terminal 40 generates the normal call using the call number information and transmits the signal called SETUP (Step S1109).

If it is determined at Step S1103 that it is not the HOME operator (No at Step S1103) or if it is determined at Step S1104 that no emergency call code information is stored in the emergency call code storage unit 61 (No at Step S1104), the mobile terminal 40 checks whether the emergency call code information is stored in the first emergency call code storage unit 71 (Step S1110). If the emergency call code information is stored in the first emergency call code storage unit 71 (Yes at Step S1110), the mobile terminal 40 compares the country code of the visited network with the mobile country code information that is stored in the first emergency call code storage unit 71 together with the emergency call code information (Step S1111).

The mobile terminal 40 stores therein country code information that is identification information unique to each country and identifies the country where the mobile terminal 40 is located now by updating the identification information. For example, the mobile terminal 40 receives the broadcast information from the mobile communication base station 10, acquires the mobile country code information from the received broadcast information, and stores the mobile country code information in a predetermined storage unit. The predetermined storage unit, herein, is a storage unit other than those above-described storage units including the emergency call code storage unit 61, the first emergency call code storage unit 71, the second emergency call code storage unit 72, and the default emergency call code storage unit 73.

If it is determined at Step S1111 that the country code of the visited network that is read from the predetermined storage unit is identical to the mobile country code information that is stored in the first emergency call code storage unit 71 together with the emergency call code information (Yes at Step S1111), the mobile terminal 40 reads the emergency call code information from the first emergency call code storage unit 71 (Step S1112) and compares the received call number information with the read emergency call code information (Step S1113).

If identical information is found (Yes at Step S1114), the mobile terminal 40 generates the emergency call using the call number information and transmits the signal called EMERGENCY SETUP (Step S1115).

If it is determined at Step S1110 that no emergency call code information is stored in the first emergency call code storage unit 71 (No at Step S1110) or if it is determined at Step S1114 that the received call number information is different from the read emergency call code information (No at Step S1114), the mobile terminal 40 checks whether the emergency call code information is stored in the second emergency call code storage unit 72 (Step S1116).

If the emergency call code information is stored in the second emergency call code storage unit 72 (Yes at Step S1116), the mobile terminal 40 compares the country code of the visited network that is read from the predetermined storage unit with the mobile country code information that is stored in the second emergency call code storage unit 72 together with the emergency call code information (Step S1117).

If they are identical (Yes at Step S1117), the mobile terminal 40 reads the emergency call code information from the second emergency call code storage unit 72 (Step S1118) and compares the received call number information with the read emergency call code information (Step S1119).

If identical information is found (Yes at Step S1120), the mobile terminal 40 generates the emergency call using the call number information and transmits the signal called EMERGENCY SETUP (Step S1121).

If it is determined at Step S1116 that no emergency call code information is stored in the second emergency call code storage unit 72 (No at Step S1116) or if it is determined at Step S1120 that the received call number information is different from the read emergency call code information (No at Step S1120), the mobile terminal 40 checks whether the emergency call code information is stored in the default emergency call code storage unit 73 (Step S1122).

If the emergency call code information is stored in the default emergency call code storage unit 73 (Yes at Step S1122), the mobile terminal 40 compares the country code of the visited network that is read from the predetermined storage unit with the mobile country code information that is stored in the default emergency call code storage unit 73 together with the emergency call code information (Step S1123).

If they are identical (Yes at Step S1123), the mobile terminal 40 reads the emergency call code information from the default emergency call code storage unit 73 (Step S1124) and compares the received call number information with the read emergency call code information (Step S1125).

If identical information is found (Yes at Step S1126), the mobile terminal 40 generates the emergency call using the call number information and transmits the signal called EMERGENCY SETUP (Step S1127). If it is determined at Steps S1123 and S1126 that the country code information of the visited network is not identical to the mobile country code information (No at Step S1123) or if the received call number information is different from the read emergency call code information (No at Step S1126), the mobile terminal 40 generates the normal call using the call number information that has been received as the call generating request and transmits the signal called SETUP (Step S1128) and the process control goes to end.

Effects of Second Embodiment

As described above, the mobile communication base station according to the second embodiment transmits broadcast information containing the emergency call code information, which is information about the call numbers of the emergency agents, to a mobile terminal with the status "Camped on any cell" defined in the 3GPP specification "TS25.304" in the same manner as the mobile communication base station according to the first embodiment. Upon receiving the broadcast information from the mobile communication base station, the mobile terminal acquires the emergency call code information from the received broadcast information. With this configuration, a mobile terminal with the status "Camped on any cell" can acquire the emergency call code information.

[c] Third Embodiment

Although various embodiments of the present invention haven been described, the present invention can be implemented by some other embodiments. Different embodiments are described in the following sections (1) to (4).

(1) Storage of Emergency Call Code Information

Although, in the above first embodiment, the section called "Emergency Call Code Information" is added to the Master Information Block and the emergency call code information is stored in the section, the present invention is not limited thereto. As long as information is broadcast information that is received by a mobile terminal with the status communicable with the mobile communication base station from the perspective of the radio wave strength or by a mobile terminal shifting from the start-up to the communicable status, the information can be stored in any format of the System Information Blocks defined in the 3GPP specification "TS25.331".

Figure 12:
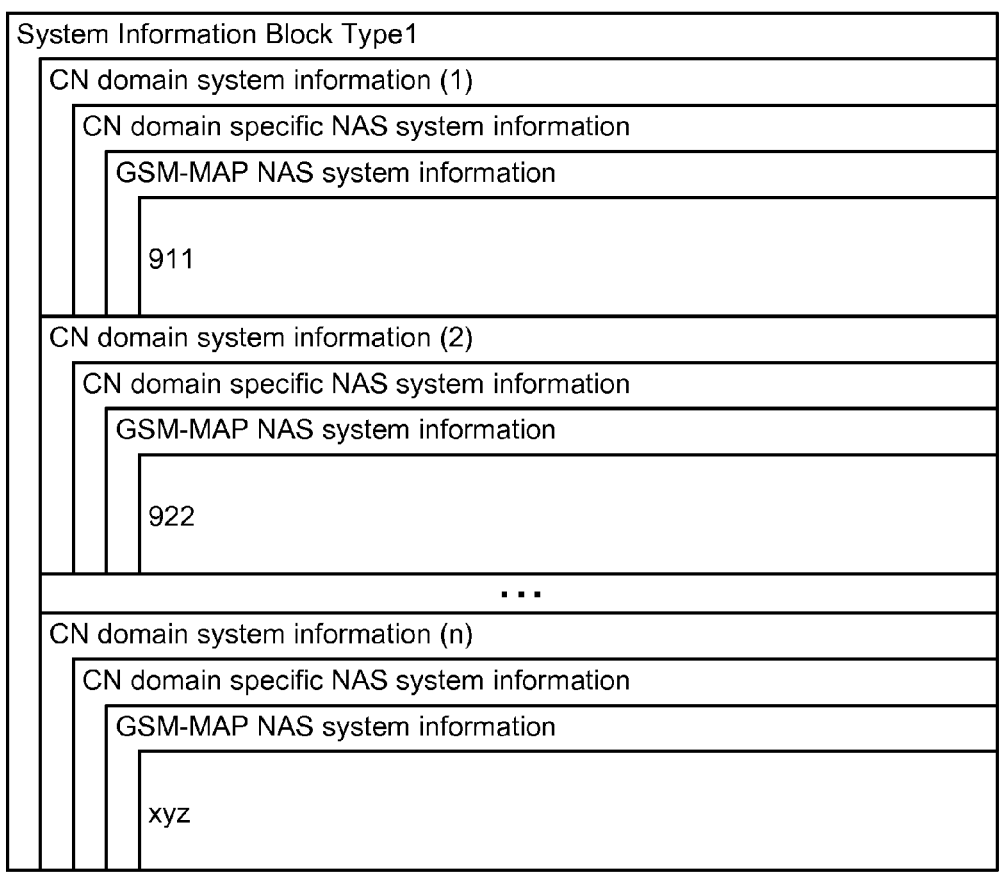
FIG. 12 is a diagram that explains how the emergency call code information is stored in the format called System Information Block Type1.

For example, as illustrated in FIG. 12, the emergency call code information "911" can be stored in a section of the GSM-MAP NAS system information in the System Information Block Type1 that is a type of the format called System Information Blocks. FIG. 12 is a diagram that explains how the emergency call code information is stored in the format called System Information Block Type1.

Figure 13:
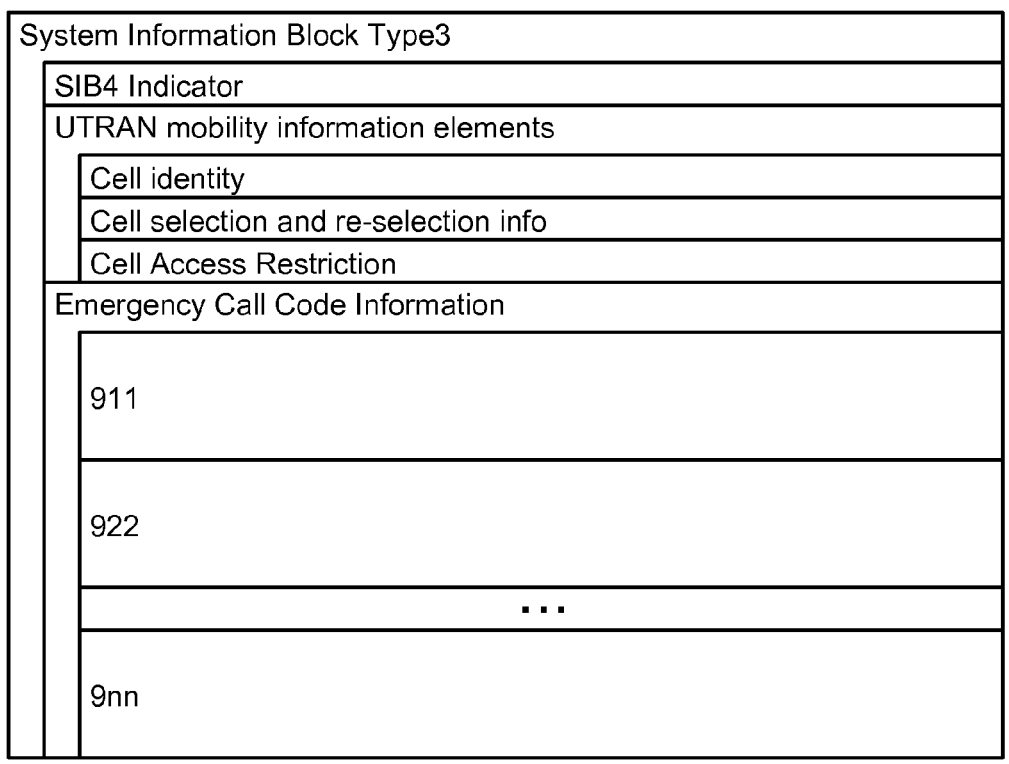
FIG. 13 is a diagram that explains how the emergency call code information is stored in the format called System Information Block Type3.
Figure 19:
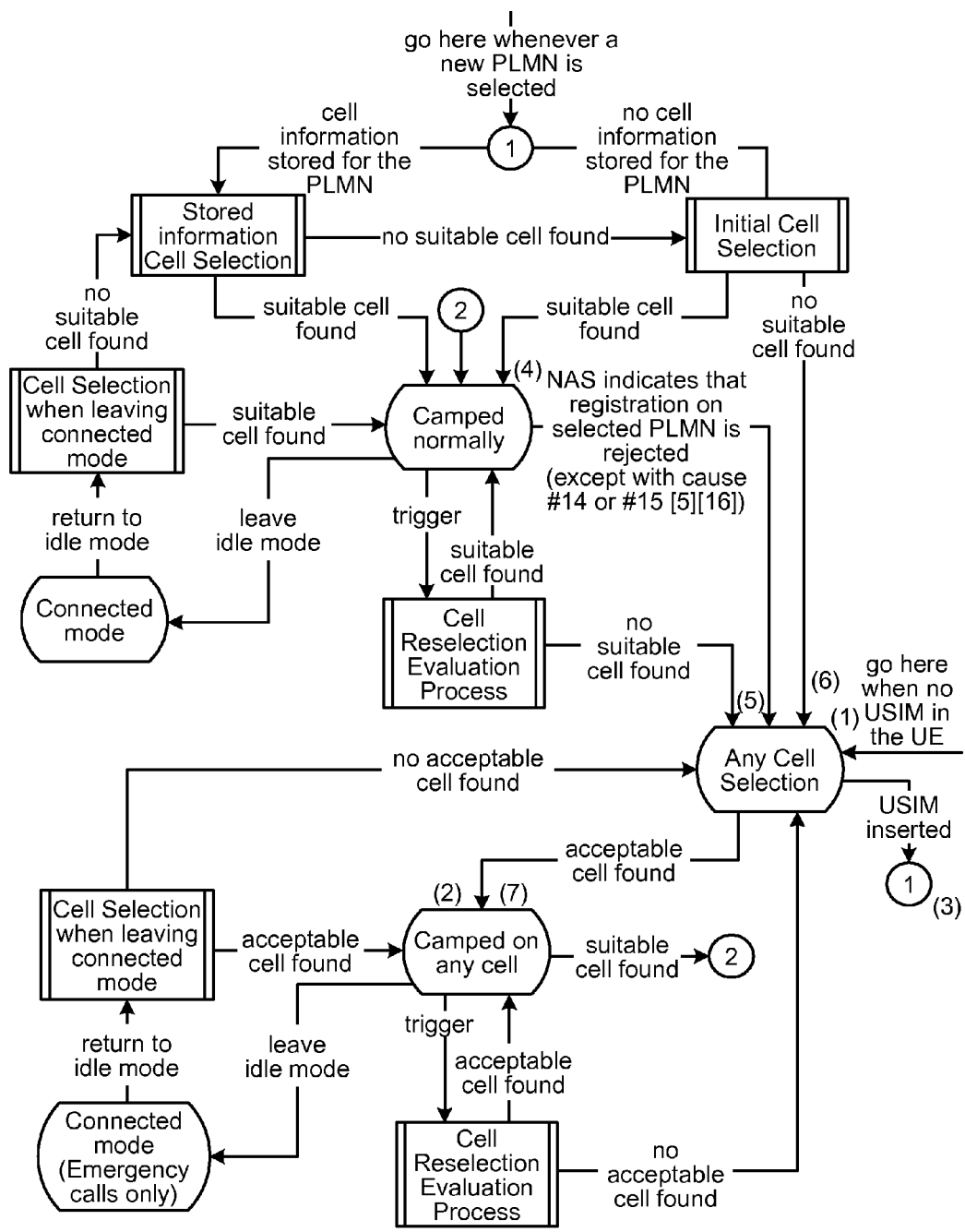
FIG. 19 is a diagram that illustrates status transmission in Cell Selection/Reselection defined in the 3GPP specification "TS25.304".

Moreover, for example, as illustrated in FIG. 13, it is allowable to add the section called "Emergency Call Code Information" to the System Information Block Type3, which is a format of the System Information Blocks, and store the emergency call code information "911" or the like in the section. FIG. 13 is a diagram that explains how the emergency call code information is stored in the format called System Information Block Type3.

Still moreover, for example, as illustrated in FIG. 14, it is allowable to add the section called "Emergency Call Code Information" to the System Information Block Type 5, which is a format of the System Information Blocks, and store the emergency call code information "911" or the like in the section. FIG. 14 is a diagram that explains how the emergency call code information is stored in the format called System Information Block Type 5.

Furthermore, for example, as illustrated in FIG. 15, it is allowable to add the section called "Emergency Call Code Information" to the System Information Block Type 7, which is a format of the System Information Blocks, and store the emergency call code information "911" or the like in the section. FIG. 15 is a diagram that explains how the emergency call code information is stored in the format called System Information Block Type 7.

Still furthermore, for example, as illustrated in FIG. 16, it is allowable to add the section called "Emergency Call Code Information" to the System Information Block Type11, which is a format of the System Information Blocks, and store the emergency call code information "911" or the like in the section. FIG. 16 is a diagram that explains how the emergency call code information is stored in the format called System Information Block Type11.

(2) Addition of Format

Although, in the above first embodiment, the emergency call code information is stored using only the existing System Information Blocks defined in the 3GPP specification "TS25.331", the present invention is not limited thereto. The emergency call code information can be stored using a newly created format. For example, as illustrated in FIG. 17, it is allowable to create a format called System Information Block Type19 and store the emergency call code information "911" or the like in the section called "Emergency Call Code Information". FIG. 17 is a diagram that explains how the emergency call code information is stored in the format called System Information Block Type19.

(3) Storage Format for Emergency Call Code Information

Although, in the above first embodiment, the emergency call code information is stored as it is without using a predetermined format, the present invention is not limited thereto. The emergency call code information can be stored using a predetermined format. For example, FIG. 18 is a diagram of a storage format defined in the 3GPP specification "TS31.102". It is allowable to store the emergency call code information using the storage format illustrated in the figure. If the predetermined storage format is used, the emergency call code information "911" or the like is stored in the section "Emergency Call Code".

(4) System Configuration and Others

The constituent elements of the device illustrated in the drawings are merely conceptual, and need not be physically configured as illustrated. The configuration of the device from the perspective of the separation and integration is not limited to the example illustrated in the drawings. The constituent elements, as a whole or in part, can be separated or integrated either functionally or physically based on various types of loads or use conditions, and, for example, the first emergency call code acquiring unit 81 and the second emergency call code acquiring unit 82 can be integrated. The process functions performed by the device are entirely or partially realized by the CPU or programs that are analyzed and executed by the CPU, or realized as hardware by wired logic.

The processing procedures, the control procedures, specific names, various data, and information including parameters described in the embodiments or illustrated in the drawings can be changed as appropriately unless otherwise specified. The numbers, such as "911", that are used as the emergency call code information cannot be changed to arbitrary numbers but can be replaced by some other call numbers indicating emergency addresses.

According to an embodiment of the invention, a terminal device with the status "Camped on any cell" can acquire emergency call code information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An emergency call code information acquiring system, comprising:
 a mobile communication base station that transmits broadcast information that is information to be broadcasted as a service; and
 a terminal device that receives the broadcast information that is autonomously transmitted from the mobile communication base station for a specified period when a power switch of the mobile communication base station is turned on and can be received by the terminal device in a first status and a second status, wherein the mobile communication base station comprises a transmitting unit that transmits broadcast information including emergency call code information that is information about a call number of an emergency agency, to the terminal device that is either in the first status in which an IC card is uninserted and the terminal device is communicable with the mobile communication base station from the perspective of radio wave strength or in the second status in which the IC card is inserted, the terminal device is communicable with the mobile communication base station from the perspective of radio wave strength, and an Attach or location registration to an Mobile-services Switching Centre MSC via the mobile communication base station and an Radio Network Controller RNC fails, and the terminal device comprises an emergency call code information acquiring unit that acquires, when the terminal device receives the broadcast information transmitted by the transmitting unit of the mobile communication base station in either the first status or the second status, the emergency call code information included in the received broadcast information, and a call processing unit that collates the emergency call code information acquired by the emergency call code information acquiring unit with the emergency call code information read from the IC card, and when the acquired emergency call code information is identical with the read emergency call code information, calls the number indicated by the emergency call code information.

2. A mobile communication base station, comprising a transmitting unit that transmits broadcast information that is autonomously transmitted from the mobile communication base station for a specified period when a power switch of the mobile communication base station is turned on and can be received by a terminal device in a first status and a second status, including emergency call code information that is information about a call number of an emergency agency, to the terminal device that is either in the first status in which an IC card is uninserted and the terminal device is communicable with the mobile communication base station from the perspective of radio wave strength or in the second status in which the IC card is inserted, the terminal device is communicable with the mobile communication base station from the perspective of radio wave strength, and an Attach or location registration to an Mobile-services Switching Centre MSC via the mobile communication base station and an Radio Network Controller RNC fails, wherein the terminal device comprises a call processing unit that collates the emergency call code information acquired by an emergency call code information acquiring unit with the emergency call code information read from the IC card, and when the acquired emergency call code information is identical with the read emergency call code information, calls the number indicated by the emergency call code information.

3. A terminal device, comprising an emergency call code information acquiring unit that acquires, when the terminal device receives broadcast information that is autonomously transmitted from a mobile communication base station for a specified period when a power switch of the mobile communication base station is turned on and can be received by the terminal device in a first status and a second status, transmitted by the mobile communication base station either in the first status in which an IC card is uninserted and the terminal device is communicable with the mobile communication base-station device from the perspective of radio wave strength or in the second status in which the IC card is inserted, the terminal device is communicable with the mobile communication base-station device from the perspective of radio wave strength, and an Attach or location registration to an Mobile-services Switching Centre MSC via the mobile communication base station and an Radio Network Controller RNC fails, emergency call code information included in the received broadcast information, and a call processing unit that collates the emergency call code information acquired by the emergency call code information acquiring unit with the emergency call code information read from the IC card, and when the acquired emergency call code information is identical with the read emergency call code information, calls the number indicated by the emergency call code information.

4. An emergency call code information acquiring method, comprising:

transmitting broadcast information that is autonomously transmitted from a mobile communication base station for a specified period when a power switch of the mobile communication base station is turned on and can be received by a terminal device in a first status and a second status, including emergency call code information to the terminal device that is either in the first status in which an IC card is uninserted and the terminal device is communicable with the mobile communication base station from the perspective of radio wave strength or in the second status in which the IC card is inserted, the terminal device is communicable with the mobile communication base station from the perspective of radio wave strength, and an Attach or location registration to an Mobile-services Switching Centre MSC via the mobile communication base station and an Radio Network Controller RNC fails;

acquiring, when the terminal device receives broadcast information transmitted at the transmitting in either the first status or the second status, the emergency call code information included in the received broadcast information; and collating the emergency call code information acquired at the acquiring with the emergency call code information read from the IC card, and when the acquired emergency call code information is identical with the read emergency call code information, calling the number indicated by the emergency call code information.

* * * * *